(12) United States Patent
Courteille et al.

(10) Patent No.: US 7,515,603 B2
(45) Date of Patent: Apr. 7, 2009

(54) ONE-WAY CONNECTION DEVICE SUITABLE FOR USE IN AN ETHERNET NETWORK

(75) Inventors: Jean-Marie Courteille, Palaiseau (FR); Hervé Sorel, Jouy En Josas (FR)

(73) Assignee: Sagem Defense Securite, Paris (FR)

( * ) Notice: Subject to any disclaimer, the term of this patent is extended or adjusted under 35 U.S.C. 154(b) by 892 days.

(21) Appl. No.: 10/989,493

(22) Filed: Nov. 17, 2004

(65) Prior Publication Data
US 2005/0105548 A1 May 19, 2005

(30) Foreign Application Priority Data
Nov. 18, 2003 (FR) .................................. 03 13462
Jul. 2, 2004 (FR) .................................. 04 07347

(51) Int. Cl.
*H04L 12/66* (2006.01)
(52) U.S. Cl. ...................................... 370/463; 370/420
(58) Field of Classification Search .................. 370/447, 370/465, 401, 402, 395, 285, 358, 419, 420, 370/421, 423, 463, 359
See application file for complete search history.

(56) References Cited

U.S. PATENT DOCUMENTS

| 4,782,300 A | * | 11/1988 | Bonaccio et al. ............ 324/509 |
| 5,311,114 A | | 5/1994 | Sambamurthy et al. |
| 5,535,211 A | * | 7/1996 | Yano .......................... 370/447 |
| 5,608,729 A | | 3/1997 | Orsic |
| 5,754,552 A | * | 5/1998 | Allmond et al. ............. 370/465 |
| 2003/0182580 A1 | | 9/2003 | Lee |

FOREIGN PATENT DOCUMENTS

EP        1 164 766 A2    12/2001

* cited by examiner

*Primary Examiner*—Brenda Pham
(74) *Attorney, Agent, or Firm*—Muncy, Geissler, Olds & Lowe, PLLC

(57) ABSTRACT

A one-way connection device between at least a first Ethernet interface and a second Ethernet interface respectively comprising a first transmitter-receiver and a second transmitter-receiver each provided with external message transmit terminals and external message receive terminals, the device comprising a connection member for connecting the external transmit terminals of the first transmitter-receiver to the external receive terminals of the second transmitter-receiver, and a line-integrity signal transmit member connected to the external receive terminals of the first transmitter-receiver, the external transmit terminals of the second transmitter-receiver being kept disconnected from the external receive terminals of the first transmitter-receiver.

8 Claims, 4 Drawing Sheets

ONE-WAY CONNECTION DEVICE SUITABLE FOR USE IN AN ETHERNET NETWORK

The present invention relates to a one-way connection device usable in an Ethernet network.

BACKGROUND OF THE INVENTION

In order to connect together a first computer and a second computer, it is known to associate the computers with first and second Ethernet interfaces each comprising a transmit-receive module commonly referred to as a transceiver, provided with external message transmit terminals and external message receive terminals. A connection is established between the two interfaces by means of a cable extending between the external transmit terminals of the transceiver of the first interface and the external receive terminals of the transceiver of the second interface, and by a cable disposed between the external receive terminals of the transceiver of the first interface and the first external transmit terminals of the transceiver of the second interface. Ethernet networks are particularly reliable and enable relatively high data rates to be achieved.

It can happen that it is desired to restrict the passage of information from the second computer to the first computer, e.g. in order to prevent a user of the second computer having access to information on the first computer, causing the first computer to malfunction, or taking control thereof. This applies, for example, when the first computer forms part of a highly secure network, while the second computer forms part of a network having a low level of security.

Filter software exists for the purpose of achieving such a restriction on the passage of information. Nevertheless, it can happen that such software presents weaknesses such as hidden channels or ports that can be exploited in order to corrupt operation thereof.

It is also known to connect the first computer and the second computer to a protection device of the "firewall" type that filters messages passing therethrough between the two computers. Such a device provides only a relative degree of security and there exists a risk of non-authorized messages being able to transit from the second computer to the first computer in spite of the protection device. For example, software exists enabling the functions of the transmit terminals and the receive terminals to be interchanged, and without the protection device being able to detect the interchange. Such devices are also relatively complex to implement.

Document EP-A-1 164 766 discloses a device for connecting a first network to a second network, the device including a switch member arranged to allow transmission from the first network towards the second network or in the opposite direction on a selective basis.

It might be thought that the connection for transmitting messages from the second computer to the first computer in an Ethernet network could be interrupted in the same manner. Unfortunately, in an Ethernet network, Ethernet interfaces check for the presence of a line-integrity signal (or a presence signal) at the external receive terminals of the transceiver, prior to transmitting a message. Eliminating the connection enabling a message to be transmitted from the second computer to the first computer prevents the existence of said signal being verified. The switch member of the above-mentioned document is thus not suitable for use in such a network, without modifying the structure of the Ethernet interface and the software that operates it in order to allow the first computer to transmit its message even though the line-integrity signal has not been detected. Such modifications would be relatively complex and would run the risk of degrading the reliability of the Ethernet connection.

OBJECT OF THE INVENTION

An object of the invention is to propose a one-way connection between two Ethernet interfaces, which connection is both simple and reliable.

BRIEF SUMMARY OF THE INVENTION

To this end, the invention provides a one-way connection device between at least a first Ethernet interface and a second Ethernet interface respectively comprising a first transceiver and a second transceiver each provided with external message transmit terminals and external message receive terminals, the device including a connection member for connecting the external transmit terminals of the first transceiver to the external receive terminals of the second transceiver, and a line-integrity signal transmit member connected to the external receive terminals of the first transceiver, the external transmit terminals of the second transceiver being kept disconnected from the external receive terminals of the first transceiver.

Thus, a line-integrity signal is transmitted to the first Ethernet interface so that the lack of connection between the external transmit terminals of the second transceiver and the external receive terminals of the first transceiver does not interfere with operation of the first Ethernet interface. This lack of connection makes it possible to limit the risk of unauthorized information transiting from the second Ethernet interface to the first Ethernet interface.

In a first embodiment, the connection member includes at least one analog amplifier connected to the first transceiver and to the second transceiver for amplifying the message coming from the first transceiver and going towards the second transceiver.

The amplifier prevents the connection normally used for transmitting messages from the first transceiver to the second transceiver being used for conveying information coming from the second transceiver to the first transceiver.

In which case, the transmit member preferably comprises a branch connection connecting an output from the analog amplifier to the external receive terminals of the first transceiver.

The line-integrity signal from the external transmit terminals of the first transceiver is then returned to its external receive terminals. The transmit member is then particularly simple in structure.

In a variant, the transmit member comprises a transceiver having external transmit terminals connected to the external receive terminals of the first transceiver.

The transceiver of the transmit member is then used only to transmit the line-integrity signal to the first transceiver of the first Ethernet interface. Such a component is relatively inexpensive and commonplace in the field of Ethernet networks, thereby making it easier to implement.

In a second particular embodiment, the device includes a third transceiver having external transmit terminals and external receive terminals respectively connected to the external receive terminals and to the external transmit terminals of the first transceiver, and a fourth transceiver having external transmit terminals and external receive terminals respectively connected to the external receive terminals and to the external transmit terminals of the second transceiver, the third transceiver having internal transmit terminals connected to internal receive terminals of the fourth transceiver via a buffer memory and internal receive terminals kept disconnected from the internal transmit terminals of the fourth transceiver.

The third transceiver serves to transmit the line-integrity signal towards the first transceiver. The buffer memory enables the data rate of the internal transmit terminals of the third transceiver to be matched to the data rate of the internal receive terminals of the fourth transceivers, and also allows the message to be repeated. The buffer memory makes it possible to avoid problems of loss of synchronization between the clock of the third transceiver and the clock of the fourth transceiver. The connections between the third transceiver and the fourth transceiver and the buffer memory are generally formed by an xMII type bus which is one-way by design. Such connections therefore cannot be used for transmitting messages from the second computer to the first computer.

Advantageously, the first interface is associated with a first computer having a discrete signal input port and the second interface is associated with a second computer having a discrete signal output port, the device including a connection member connected to said ports and provided with a lowpass filter, preferably arranged to pass signals at a frequency of less than about 1 hertz (Hz).

This makes it possible to pass acknowledgments of test signals from the second equipment to the first equipment. Nevertheless, the lowpass filter prevents elaborate signals passing, which might be used to cause the first equipment to function wrongly.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
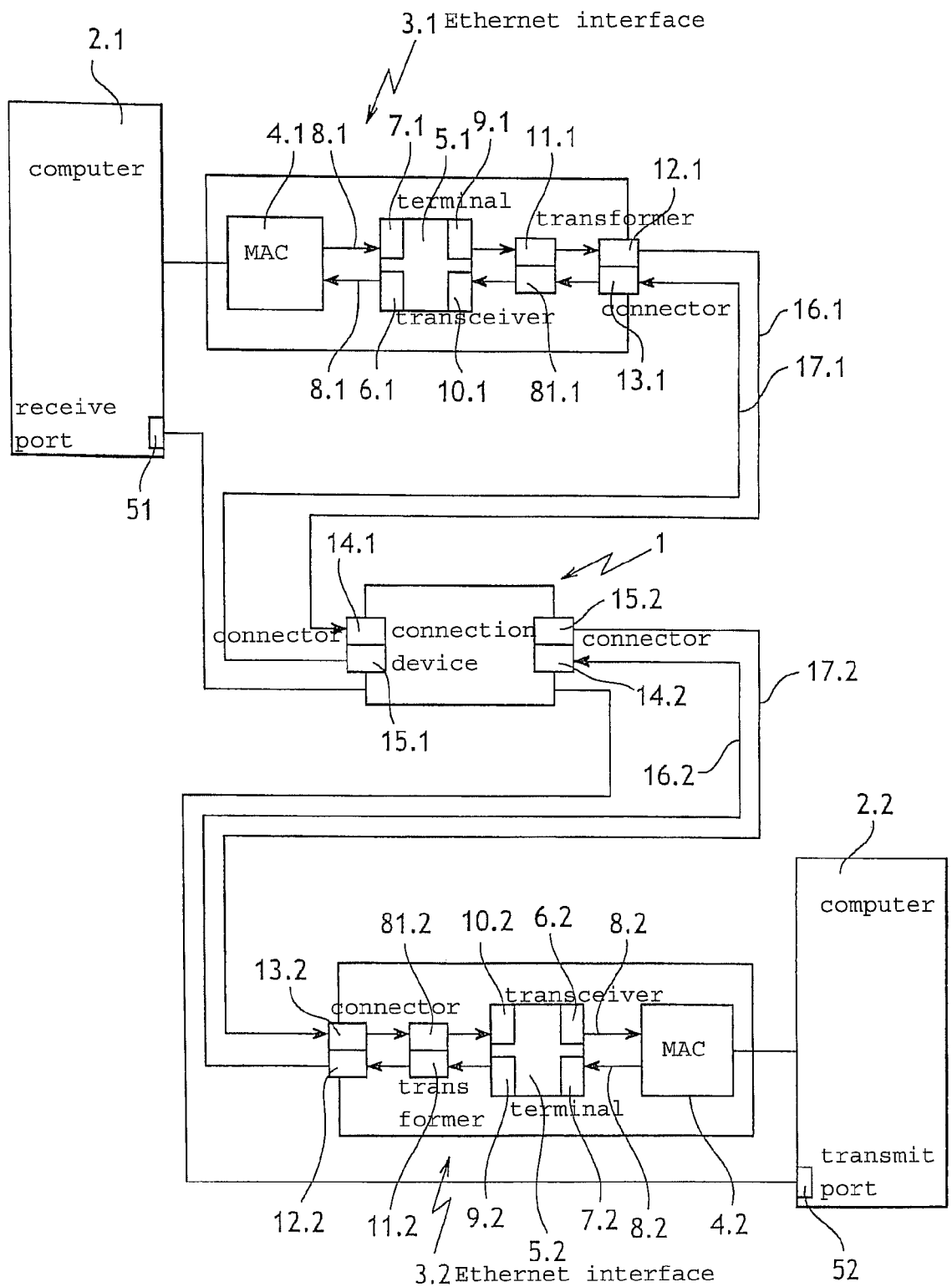
FIG. 1 is a diagrammatic view of a network having a device in accordance with the invention implanted therein.

With reference to FIG. 1, the one-way connection device in accordance with the invention is given overall reference 1.

The one-way connection device 1 is disposed between two computers 2.1 and 2.2 (in the description below, the indices ".1" and ".2" designate elements associated with the computers 2.1 and 2.2 respectively). The computers 2.1 and 2.2 may each form a part of a respective network.

The computers 2.1 and 2.2 are fitted with respective Ethernet interfaces given overall references 3.1 and 3.2.

The Ethernet interface 3.1 comprises in conventional manner a media access control module (MAC) 4.1 connected firstly to the computer 2.1 and secondly to a transceiver 5.1 The transceiver 5.1 has internal message transmit terminals 6.1 and internal message receive terminals 7.1 connected by xMII buses 8.1 to the access control module 4.1. The receive 5.1 also has external transmit terminals 9.1 connected via an isolating transformer 11.1 to an output connector 12.1, and external receive terminals 10.1 connected via an isolating transformer 81.1 to an input connector 13.1.

The Ethernet interface 3.2 has the same structure as the Ethernet interface 3.1. The structure and the operation of the Ethernet interfaces 3 are conventional. The Ethernet interfaces 3 enable messages to be conveyed between each other. Messages being conveyed by an Ethernet connection are commonly referred as frames, and include in particular addressing information relating to the source of the message and to the destination of the message, together with control information (type of data, length of message, . . . ), and the data proper.

The connection device 1 has input connectors 14.1, 14.2 connected respectively to the output connectors 12.1, 12.2 of the Ethernet interfaces 3.1, 3.2 via twisted-pair cables 16.1, 16.2. The connection device 1 also comprises output connectors 15.1, 15.2 connected respectively to the input connectors 13.1, 13.2 of the Ethernet interfaces 3.1, 3.2 via twisted-pair cables 17.1, 17.2.

The first embodiment of the connection device 1 is described below.

Figure 2:
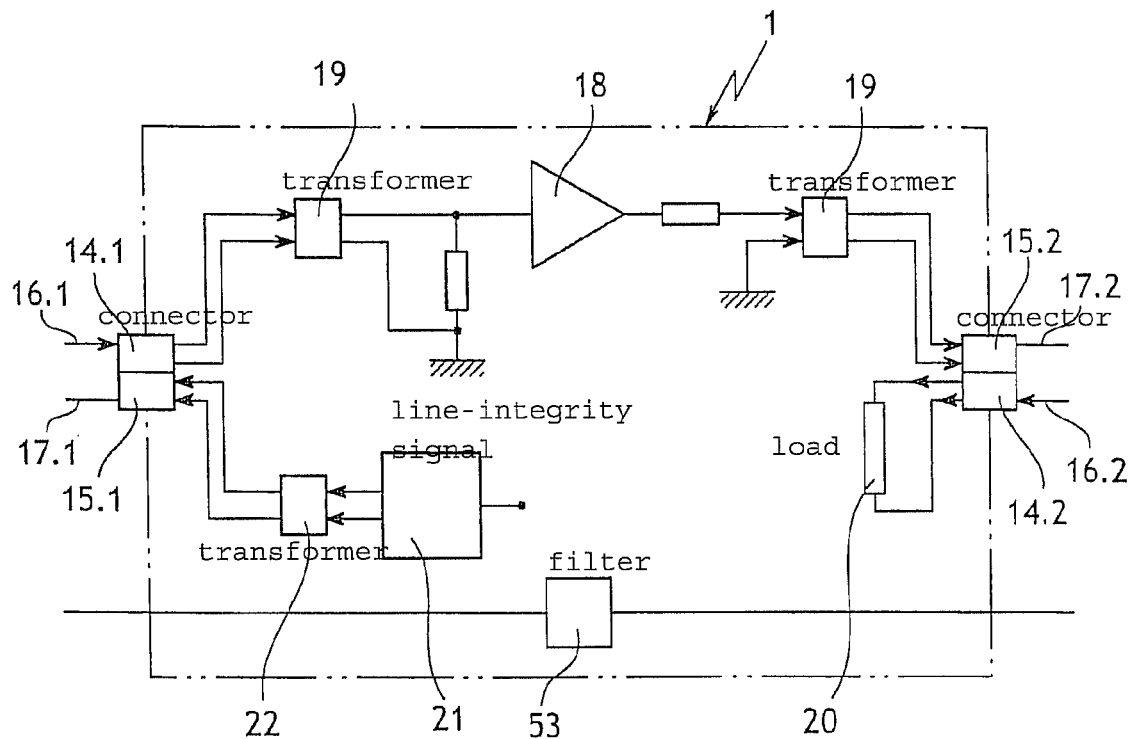
FIG. 2 is a diagram of such a device, in a first embodiment.

With reference more particularly to FIG. 2, the connection device 1 in a first embodiment of the invention comprises an analog amplifier 18 connected via isolating transformers 19 firstly to the input connector 14.1 and secondly to the output connector 15.2 for amplifying messages coming from the computer 2.1 and going to the computer 2.2.

The connection device 1 further comprises a load 20 connected to the input connector 14.2 for impedance-matching purposes.

The connection device 1 further comprises a line-integrity signal source 21 connected via an isolating transformer 22 to the connector 15.1. The line-integrity signal source 21 provides the external receive terminals 10.1 of the transceiver 5.1 with a signal that is identical to the line-integrity signal (or presence signal) that would normally be generated by the transceiver. The source of the line-integrity signal 21 is in this case a transceiver whose external transmit terminals are connected to the connector 15.1 via the transformer 22.

A message coming from the computer 2.1 is transmitted via the Ethernet interface 3.1 to the access control module 4.1 and then to the transceiver 5.1. After verifying the presence of the line-integrity signal at the external receive terminals 10.1, the message is transmitted to the external transmit terminals 9.1 leading to the connection device 1 where the message is amplified by the amplifier 18 prior to being transmitted to the Ethernet interface 3.1 and then to the computer 2.2.

There is no connection between the input connector 14.2 and the output connector 15.1, so that the external transmit terminals 9.2 of the transceiver 5.2 are disconnected from the external receive terminals 10.1 of the transceiver 5.1. No message transmitted from the external transmit terminals 9.2 can therefore reach the external receive terminals 10.1.

The amplifier 18 also prevents the connection between the external transmit terminals 9.1 of the transceiver 5.1 and the external receive terminals 10.2 of the transceiver 5.2 being used for passing a message from the Ethernet interface 3.2 to the Ethernet interface 3.1.

Furthermore, the computer 2.1 has a discrete signal receive port 51 and the computer 2.2 has a discrete signal transmit port 52.

The connection device 1 has a lowpass filter 53 connected to the transmit port 52 of the computer 2.2 and to the receive port 51 of the computer 2.1 in order to pass signals at a frequency that is less than or equal to 1 Hz. These signals can be used for testing the one-way connection, and for example for verifying that a message sent by the computer 2.1 has indeed been received by the computer 2.2. The lowpass filter 53 prevents elaborate signals passing, which would necessarily be at a frequency greater than 1 Hz, so it is not possible from the second computer to control the first computer or to cause it to malfunction over this low-frequency connection.

Figure 3:
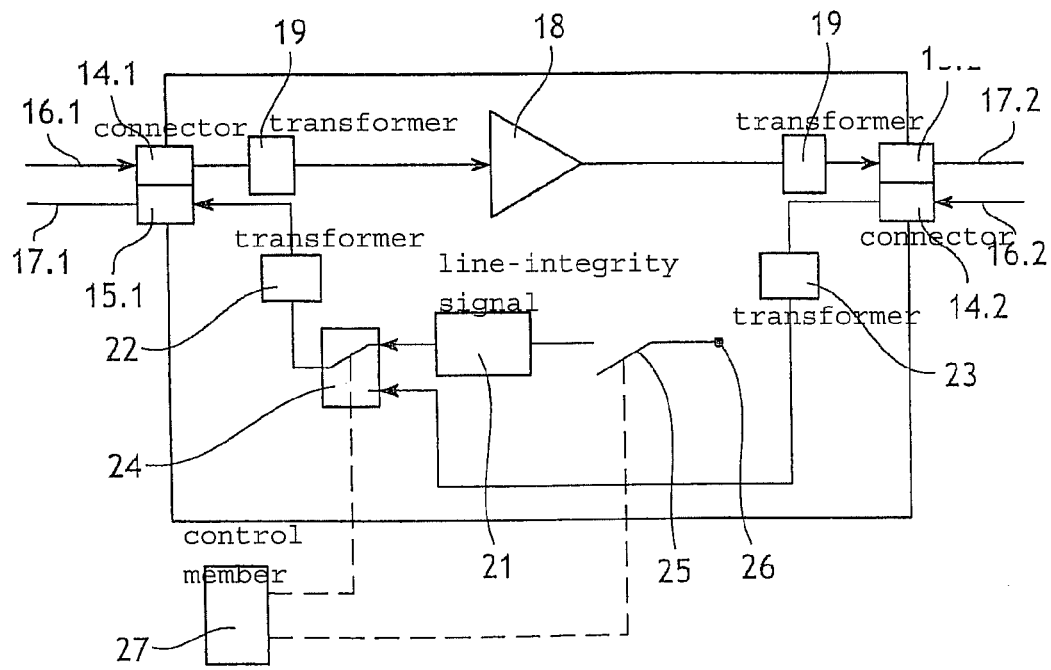
FIG. 3 is a diagram of a first variant of the first embodiment of the invention.

In a first variant, as shown in FIG. 3 (the diagram of FIG. 3 reproduces in simplified manner a portion of the diagram of FIG. 2), the input connector 14.2 is connected via an isolating transformer 23 to a switch 24 connected between the line-integrity signal source 21 and the isolating transformer 22. The switch 24 has a first state in which the voltage source 21 is connected to the output connector 15.1 via the transformer 22, and a second state in which the input connector 14.2 is connected to the output connector 15.1 via the transformer 21.

A switch 25 is also disposed between the line-integrity signal source 21 and its electrical power supply 26.

A control member 27, such as a three-position rotary knob, is connected to the switch 24 and to the switch 25 in order to control them.

The control member 27 has three states that can be activated selectively, namely:
- a state for blocking connection in which the switch 24 is in its first state and the switch 25 is open-circuit so that the input connector 14.2 is connected to the output connector 15.1, and so that since the line-integrity signal source 21 is unpowered, the line-integrity signal is not transmitted to the output connector 15.1, and the transceiver 5.1 cannot operate;
- a one-way connection state in which the switch 22 is in its first position and the switch 23 is closed so that the input connector 14.2 is disconnected from the output connector 15.1 and the line-integrity signal source 21 is powered so as to transmit the line-integrity signal to the output connector 15.1. Connection is then possible only from the computer 2.1 to the computer 2.2; and
- a two-way connection state in which the switch 22 is in its second state so that the input connector 14.2 is connected to the output connector 15.1, thereby enabling messages to pass from the computer 2.1 to the computer 2.2 and messages to pass from the computer 2.2 to the computer 2.1.

Figure 4:
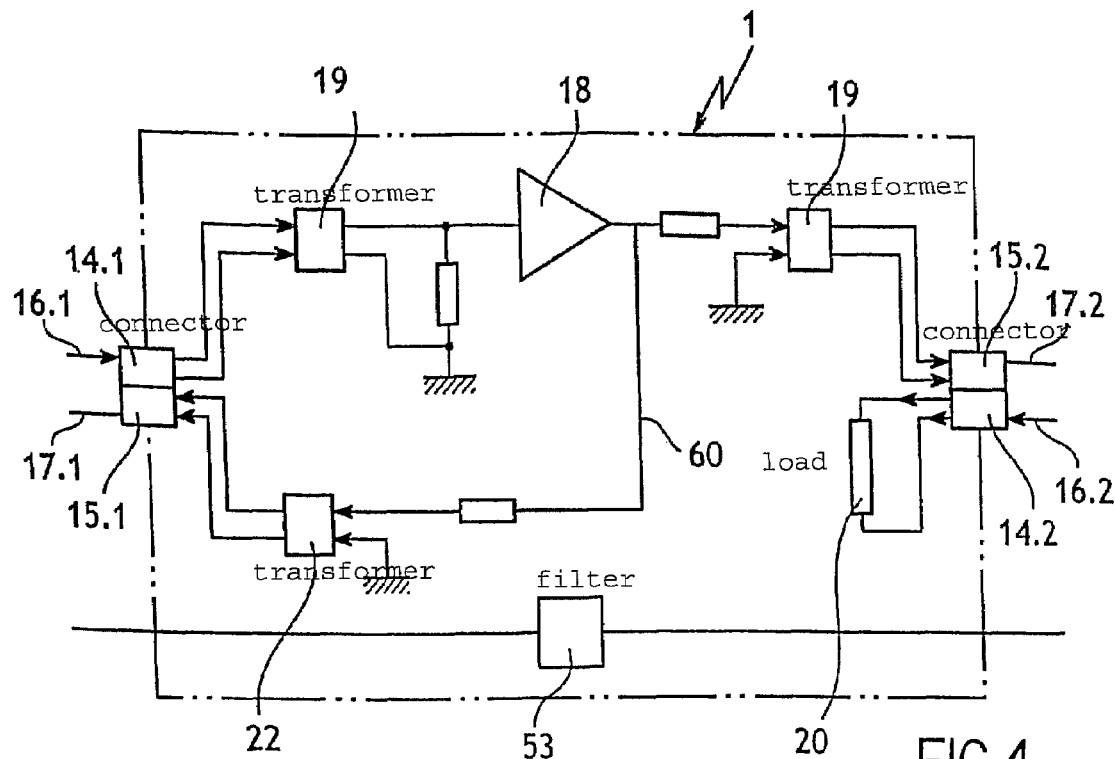
FIG. 4 is a diagram of a second variant of the first embodiment of the invention.

In a second variant shown in FIG. 4, the line-integrity signal transmit member comprises a branch connection 60 extending between the output from the analog amplifier 18 and the isolating transformer 22.

Thus, the line-integrity signal and the messages transmitted from the external transmit terminals of the transceiver 5.1 are transmitted both to the external receive terminals of the transceiver 5.2 and also to the external receive terminals of the transceiver 5.1 via the branch connection 60. The messages which are not intended for the computer 2.1 are not taken into account.

In this variant, it is also possible in simple manner to verify that the message transmission system between the computer 2.1 and the analog amplifier 18 is in operation by sending a message from the computer 2.1 that is addressed to the computer 2.1, which message should return thereto via the branch connection 60.

Figure 5:
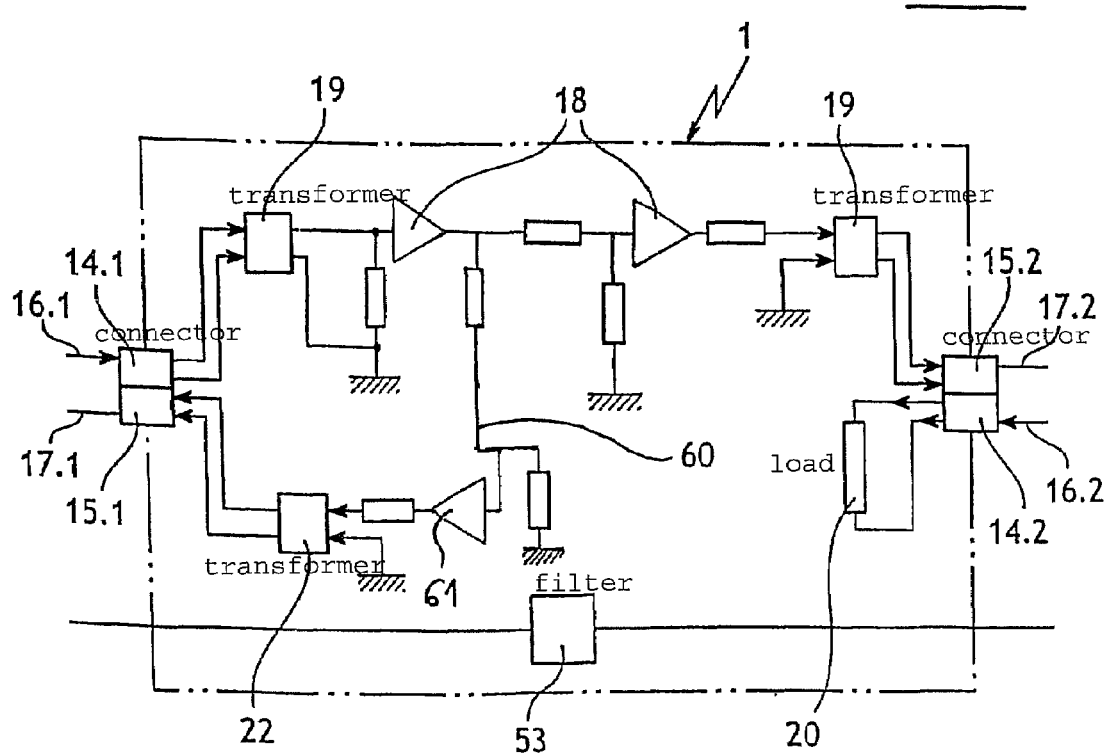
FIG. 5 is a diagram of a third variant of the first embodiment of the invention.

A third variant of the connection device 1 in the first embodiment is shown in FIG. 5.

The third variant is based on the second variant described above.

In this third variant, two analog amplifiers are disposed in series between the isolating transformers 19.

The branch connection 60 possesses a connection point between the two amplifiers 18 and a connection point with the isolating transformer 22, and it includes its own analog amplifier 61.

The use of two amplifiers 18 enables the reliability of the connection device to be increased. The only way in which a message could pass from the computer 2.2 to the computer 2.1 would be for a first breakdown to occur on the amplifier 18 adjacent to the connector 15.2, leaving the input and the output of said amplifier short-circuited together. Nevertheless, if the first breakdown were to occur, the amplifier 18 adjacent to the connector 14.1 would continue to operate, thereby imposing its output level and blocking any signal attempting to return via the faulty amplifier. It would then be necessary for a second breakdown to occur on the amplifier 18 adjacent to the connector 14.1 leaving the output of that amplifier open-circuit.

The first breakdown has a very low or zero probability of arising. The probability of both breakdowns arising simultaneously is even lower.

In the figures, there can be seen resistors which are used in conventional manner for matching impedances, and for compensating the gains of the amplifiers (each amplifier in this case has a gain of two).

The second embodiment of the connection device 1 is described below. Only the references of the elements internal to the connection device 1 are changed (the references for the input and output connectors 14.1, 14.2, 15.1, 15.2, and for the lowpass filter 53 nevertheless being retained).

Figure 6:
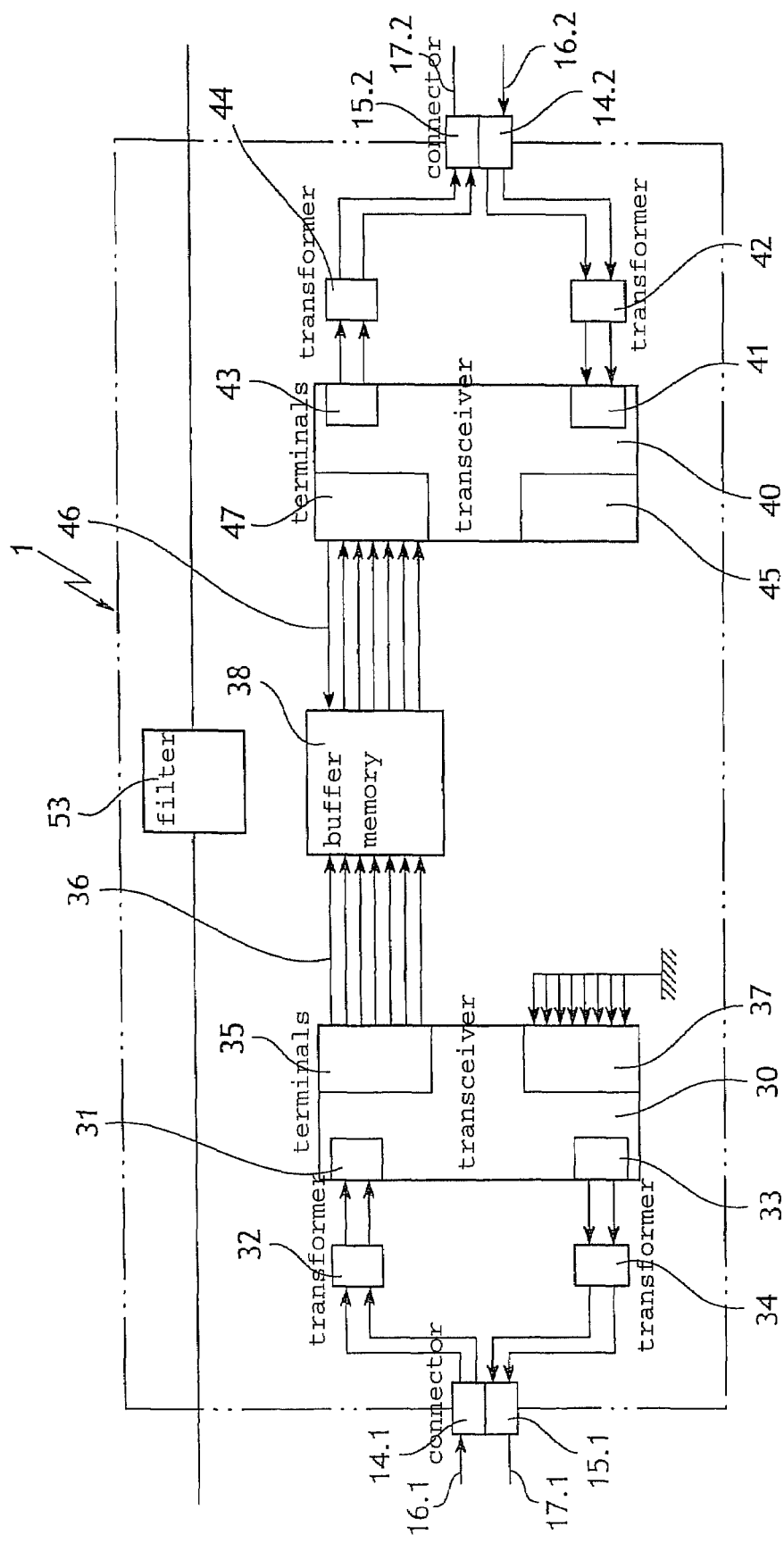
FIG. 6 is a diagram of such a device constituting a second embodiment of the invention.

With reference to FIG. 6, the connection device 1 in the second embodiment of the invention comprises a transceiver 30 having external receive terminals 31 connected via an isolating transformer 32 to the input connector 14.1, and external transmit terminals 33 connected via an isolating transformer 34 to the output connector 15.1. The transceiver 30 also has internal transmit terminals connected via an xMII bus 36 to a buffer memory 38, and internal receive terminals 37 that are not connected.

The connection device further comprises a transceiver 40 having external receive terminals 41 connected via an isolating transformer 42 to the input connector 14.2 and external transmit terminals 43 connected via an isolating transformer 44 to the output connector 14.2. The transceiver 40 also has internal transmit terminals 45 that are connected and internal receive terminals 47 that are connected via an xMII bus 46 to the buffer memory 38.

Via its external transmit terminals, the transceiver 30 transmits a carrier to the output connector 15.1, and thus to the external receive terminals 10.1 of the transceiver 5.1.

The buffer memory 37 serves to match the data rate of the internal transmit terminals 35 of the transceiver 30 to that of the internal receive terminals 47 of the transceiver 40, and it also enables the message to be repeated. By design, the xMII buses 36 and 46 are one-way buses, and therefore cannot be used for causing a message to pass from the Ethernet interface 3.2 to the Ethernet interface 3.1.

Since the internal transmit terminals 45 of the transceiver 40 are not connected to the internal receive terminals of the transceiver 30, there is no connection between the input connector 14.2 and the output connector 15.1. The external transmit terminals 9.2 of the transceiver 5.2 of the Ethernet interface 3.2 are thus disconnected from the external receive terminals 10.1 of the transceiver 5.1 of the Ethernet interface 3.1, such that no message can pass from the Ethernet interface 3.2 to the Ethernet interface 3.1.

In contrast, the external transmit terminals 33 of the transceiver 30 are connected to the external receive terminals 10.1 of the transceiver 5.1 of the Ethernet interface 3.1 and send the line-integrity signal thereto.

Furthermore, the computer 2.1 includes a discrete signal receive port 51, and the computer 2.2 includes a discrete signal transmit port 52.

The connection device 1 includes a lowpass filter 53 connected to the transmit port 52 of the computer 2.2 and to the receive port 51 of the computer 2.1 in order to pass signals at a frequency that is less than or equal to 1 Hz. These signals can be used for testing the one-way connection, and for example for verifying that a message sent by the computer 2.1 has indeed been received by the computer 2.2. The lowpass filter 53 prevents elaborate signals passing, since they would necessarily have a frequency greater than 1 Hz, thus ensuring that it is not possible from the second computer to control the first computer or to cause it to malfunction via said low frequency connection.

Naturally, the invention is not limited to the embodiments described, and variant embodiments could be devised without going beyond the ambit of the invention as defined by the claims.

In particular, the circuit diagram of the connection device could be different from that described. For example, in the first embodiment, the connection device need not have an analog amplifier between the connectors 14.1 and 15.2 (the one-way nature of the one-way connection is then ensured in a manner that is less reliable). In addition, in the first and second variants, it is possible to use two amplifiers 18 instead of a single amplifier, and in the third variant, it is possible to use a single amplifier 18 instead of two. It is possible to use more than two amplifiers 18. In the second embodiment, switches can be located between the transformer 42 and the external receive terminals 41, and between the transformer 34 and the external transmit terminals 33 in order to make it possible either to set up a direct connection between the connectors 14.2 and 15.1 for transmitting messages from the computer 2.2 to the computer 2.1, or else to interrupt this connection (the transceiver 30 then constituting the line-integrity signal source).

Although the Ethernet interfaces in the embodiments described are associated with computers, the Ethernet interfaces could equally well be associated with any network equipment, and in particular with a router, a computer, a bridge, a switch, or the like.

Although the invention is described more particularly for a TX-based 100 connection, the invention is also applicable to other types of Ethernet network, and in particular to 10-megabit networks, or with a few modifications to 1000-megabit networks, or to optical fibers.

What is claimed is:

1. A one-way connection device between at least a first Ethernet interface and a second Ethernet interface respectively comprising a first transmitter-receiver and a second transmitter-receiver each provided with external message transmit terminals and external message receive terminals, the device comprising a connection member for connecting the external transmit terminals of the first transmitter-receiver to the external receive terminals of the second transmitter-receiver, and a line-integrity signal transmit member connected to the external receive terminals of the first transmitter-receiver, the external transmit terminals of the second transmitter-receiver being kept disconnected from the external receive terminals of the first transmitter-receiver.

2. A connection device according to claim 1, wherein the connection member includes at least one analog amplifier connected to the first transmitter-receiver and to the second transmitter-receiver for amplifying the message coming from the first transmitter-receiver and going towards the second transmitter-receiver.

3. A connection device according to claim 2, wherein the transmit member comprises a branch connection connecting an output from the analog amplifier to the external receive terminals of the first transmitter-receiver.

4. A connection device according to claim 3, wherein the branch connection includes at least one analog amplifier.

5. A connection device according to claim 2, wherein the line-integrity signal transmit member comprises a transmitter-receiver having external transmit terminals connected to the external receive terminals of the first transmitter-receiver.

6. A connection device according to claim 1, including a third transmitter-receiver having external transmit terminals and external receive terminals respectively connected to the external receive terminals and to the external transmit terminals of the first transmitter-receiver, and a fourth transmitter-receiver having external transmit terminals and external receive terminals respectively connected to the external receive terminals and to the external transmit terminals of the second transmitter-receiver, the third transmitter-receiver having internal transmit terminals connected to internal receive terminals of the fourth transmitter-receiver via a buffer memory and internal receive terminals kept disconnected from the internal transmit terminals of the fourth transmitter-receiver.

7. A connection device according to claim 1, wherein the first interface is associated with a first computer having a discrete signal input port and the second interface is associated with a second computer having a discrete signal output port, the device including a connection member connected to said ports and provided with a lowpass filter.

8. A connection device according to claim 7, wherein the lowpass filter is arranged to allow signals to pass at a frequency of less than about 1 Hz.

* * * * *